United States Patent Office 3,060,031
Patented Oct. 23, 1962

3,060,031
CHEMICALLY LEAVENED BREAD PROCESS
John H. Moriarty, Melrose, and Anne C. Nowlin, Cambridge, Mass., assignors to Arthur D. Little, Inc., Cambridge, Mass., a corporation of Massachusetts
No Drawing. Filed Aug. 1, 1960, Ser. No. 46,381
3 Claims. (Cl. 99—90)

This invention relates to new food products, and more particularly to a ready-mix composition which when blended with a liquid forms a dough suitable for baking to make a bread-like product.

In recent years there has been an ever-increasing acceptance of ready-mix compositions which require only the addition of a liquid and subsequent baking to form baked products such as bread, cake and the like. There are available ready-mixed, bread-type formulations which may be used in this manner. These contain no yeast, but depend on chemical leavening agents for their ability to rise during baking. However, these suffer from the drawback that when they are baked they have a raw, starchy, and doughy taste. In order to make these dry mixes more acceptable for widespread use it would be desirable to provide these mixes with a flavor-enhancing agent which would eliminate these unwanted flavors and aromas and at the same time would add flavors and aromas typically associated with home-baked bread. Thus the flavor-enhancing agent should be one which is capable of introducing into the dry mix and the subsequently prepared baked product the crusty, toasty and buttery flavor and aroma characteristics normally associated with home-baked products.

We have found, as will be described in detail below, that it is possible to use the condensation products resulting from the reaction between certain amino acids and sugars to serve as these flavor-enhancing agents in the bread-like products made from mixes.

It is therefore an object of this invention to provide novel flavor-enhancing agents which may be added to premixed compositions suitable for use in making bakery products. It is another object to provide dry mixes of the character described which contain flavor-enhancing agents capable of imparting to the finished baked product in which they are used the flavors associated with the corresponding homemade products. It is yet another object to provide a process by which these flavor-enhancing agents may be formed from raw materials in a manner to provide them at an economical cost. These and other objects will become apparent in the following description.

In order to provide a bread-like product, made from a ready-mix composition, but having the flavor and aroma of home-baked bread, it is necessary to impart to the finished product certain identified aromas and flavors. Analyses have indicated that the aromas to be included are those designated as ethyl alcohol, yeasty, grainy and sweet, along with just perceptible or low amounts of butyl alcohol, fruity, diacetyl and toasted. The flavor should be relatively strong in yeasty notes and also should have some grainy, toasty, sweet, sour, and bitter notes. Thus, flavor-enhancing agents should be able to duplicate these to a reasonable extent in the ready-mixed bread-like products.

The process for improving the flavor and aroma of a bread-like product of the character described, baked from a ready-mix composition, may be characterized as one which incorporates in the finished food item the condensation products formed by reacting sugars with at least one amino acid selected from the group consisting of leucine, arginine, and histidine.

The dry bread mix, which already includes a small amount of sugar (glucose) sufficient for the necessary condensation reaction, and which is suitable for adding to a liquid to form a dough for baking, may be characterized as having incorporated therein at least one amino acid selected from the group consisting of leucine, arginine, and histidine, the amino acid component or components being in a form available for reaction with the sugar to form the reaction product capable of imparting improved flavor and aroma to the resulting baked product.

Condensation products and aromas resulting from the reaction taking place between certain sugars and these amino acids are typical of the flavors and aromas associated with fresh yeast-raised bread. Leucine, $$(CH_3)_2CHCH_2CH(NH_2)COOH$$

imparts a toasty, bread-like aroma and flavor; arginine,

and histidine,

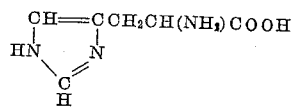

impart buttery notes to the flavor and aroma. Arginine and histidine are essentially interchangeable for flavoring purposes and one or the other may be combined with leucine. It is also possible to use only arginine or histidine in the ready-mixes.

At elevated temperatures (i.e., 100° C. or higher) these amino acids react readily with sugars to form brown condensation products the precise formulas or structures of which are not known. However, these condensation products do have distinctive flavors and aromas and are therefore applicable as flavor-enhancing agents. The sugars with which these amino acids condense are those which are well known and include glucose, sucrose, fructose, maltose, and the like, and they may be generally represented as including both mono- and polysaccharides.

In using the condensation products of the amino acids and sugars in accordance with this invention it is possible either to accomplish the reaction between the two components prior to incorporation in the bread dough, or to introduce the amino acid in a suitable form into the dry mix causing the condensation reaction between the amino acid and the sugars normally present in the dry mix to take place during the baking process. Thus the reaction may be performed prior to introduction into the dough or may be performed in situ.

The required amino acids used in the condensation reaction may, of course, be used as the pure isolated material, but in the case of the arginine and the histidine this is at present uneconomical since they are relatively expensive and their addition as flavor-enhancing agents in this pure form would add materially to the cost of the mix. On the other hand, food grade leucine is relatively inexpensive and may be added in this form. In order to make arginine and histidine available for this purpose it therefore is desirable to use one or more inexpensive sources of these amino acids and to convert such sources to forms in which they can later be condensed with sugars to form the required condensation products as flavor-enhancing agents. Such sources, fortunately are often also rich in leucine so that they may be used as the sole source of the amino acid component. This invention, therefore, contemplates the introduction of the amino acids in the novel form described below.

There are many naturally occurring proteinaceous materials, including well-known seeds and grains which are rich in "parent" proteins which may be hydrolyzed to give the amino acids required in this invention. These raw materials may be treated to form a product which, although not completely identified, is capable of furnishing the amino acids required. Hydrolysis may be accomplished either by reacting the raw materials with a strong acid, such as hydrochloric acid, or by the use of proteolytic enzymes. Among the seeds and grains which may be used in the form of meal or flour, or in other comminuted forms, may be listed cottonseeds, soybeans and distillers' dried grains. Of these, cottonseed meal has been found preferable.

The required hydrolysate of the amino acid source may be formed by reacting the comminuted grain or seed material with a strong mineral acid, preferably HCl, and then isolating the hydrolysate after removing the remaining acid traces. This step of removing the acid traces requires multiple washing and neutralization, the latter being conveniently accomplished by passing the diluted hydrolysate through an anion-exchange column. Subsequent to acid removal the diluted material is concentrated by heat to remove a portion of the water and then the concentrated liquid is treated to isolate the amino acid-containing product. This isolation is conveniently done by standard freeze-drying techniques. The final material is suitable for grinding to a flour-like consistency, in which form it is added to the ready-mix.

Because of the added effort required in removing acid traces in acid hydrolysis, it is preferred to hydrolyze the amino acid source with a proteolytic enzyme, for example pepsin (derived from the stomach of hogs), bromellin (derived from the stem of the pineapple plant), trypsin (derived from the pancreas), and ficin (from the latex of tropical trees). These proteolytic enzymes are known to attack protein and in their reaction with the raw materials rich in the parent proteins of arginine, histidine and leucine they liberate these amino acids. In the hydrolysis with enzymes the process begins with reacting the enzyme or enzymes with the raw material in water at a temperature below that at which the enzymes would be deactivated. The enzyme level may range from about 0.1% to 0.5% by weight of raw material, with 0.5% being preferable. Although this range of enzyme level is above that normally used in hydrolysis reaction, it is believed that these higher ratios are desirable to obtain a complete reaction.

The reaction is permitted to proceed for an extended time to insure complete hydrolysis (e.g., from four to twenty-four hours) at the desired elevated temperature. The resulting mixture is then centrifuged and filtered, and the filtrate is heated, such as by boiling for fifteen minutes, to completely inactivate the enzymes and to destroy any toxic impurities. The resulting filtrate is then concentrated to reduce total volume of the solution to an amount which can be handled conveniently by standard freeze-drying or spray-drying techniques. The resulting dried material is a light, fluffy solid suitable for grinding into a fine powder and incorporating directly into the bread mix. This fine powder is then used to replace the chemically pure amino acids to furnish the necessary amino acids for reaction with the sugar.

The total amount of amino acids added to react with the sugars to form the flavor-enhancing agents should range from about 0.05% to 0.5% by weight of the dry bread mix. In the case of the leucine, it is preferable that between 0.05% and 0.1% by dry weight be added; whereas in the case of the histidine and arginine, it is preferable that no more than 0.4% be used. Thus the total amount of amino acids should not exceed 0.5% and should preferably be in the range from about 0.2% to 0.4% by dry weight. If the amino acid source is the hydrolysate of a grain or seed then the hydrolysate product should also be present in a range of about 0.05% to 0.5% by dry weight.

In order to better describe this invention, examples will be given in which both the pure amino acids and the hydrolysate amino acid product are used as flavor-enhancing agents. The preparation of the hydrolysate by the two methods mentioned is illustrated in Examples IV and V. Addition of the flavor-enhancing agents so that they may form the required condensation products with the sugars in situ during baking, as well as their addition prior to incorporation in the dough made from the dry mix, is also illustrated in the examples. These examples are meant to be illustrative and not limiting.

*Example I*

This example illustrates the making of a control bread product using a typical dry mix without an additional flavor-enhancing agent. All of the remaining examples used the same dry mix and the procedure for making the dough and baking the bread products was exactly the same as given in this example except for Example III in which the flavor-enhancing agents were introduced into the liquid component.

The ready-mix bread composition contained the following, the figures in parenthesis representing percent of flour weight: flour (100%), dry milk solids (6.0%), shortening (5.0%), dextrose (5.5%), delta-lactone of gluconic acid as leavening agent (9.0%), sodium bicarbonate (3.5%) and salt (1.0%). The dry mix was prepared in accordance with standard techniques used in compounding such mixes.

The dough formed was made by adding 200 grams of the dry bread mix to 112 ml. of ice water. The mixture was kneaded in a Hobart mixer (equipped with a MacDuffee bowl and fork attachment) for two minutes on second speed and was then whipped for 65 seconds on third speed. The resulting dough was removed from the bowl and placed in a greased loaf pan. It was covered and allowed to proof for six minutes at 95 to 100° F. and was then baked at 385° F. for 40 minutes.

After the bread had cooled, slices were taken from the center portion of the loaf and the bread product was evaluated for aroma and flavor-by-mouth. The aroma was predominantly raw and starchy, together with a sweet fragrance, in addition to a toasted character present in the crust. There were some grainy and musty characteristics noted. In the flavor a grainy character occurred first in order of appearance and predominated together with baking soda taste and mouth effect. Starchy and bitter characteristics were noted at low levels. The aftertaste of this control bread showed a baking soda and astringent effect and a raw starch character. This evaluation served as a standard of comparison for products in the following examples.

*Example II*

Inasmuch as this instant mix contained a moderate amount of dextrose, it was not necessary to add additional sugar to accomplish the required condensation reaction between the amino acids and sugars to form the required flavor-enhancing agents during baking. In this example it was therefore necesasry to add to the dry mix only the required amino acid components.

To 200 grams of the bread mix there was added 0.2 gram of leucine (0.1%) and 0.9 gram of arginine (0.45%). The dry ingredients containing these amino acids were stirred to insure thorough mixing and this dry mixture was then added to 112 ml. of ice water as in the case of the control sample described in Example I. The dough was mixed, handled and baked in precisely the same manner as in Example I. When samples were cut from the loaf and analyzed it was found that the undesirable, raw, starchy and baking soda aromas and flavors present in the control sample were eliminated. Moreover this sample containing the flavor-enhancing agents had a bread-like, somewhat buttery flavor with toasted characteristics.

When 0.9 gram (0.45%) of histidine was substituted for the argine essentially the same results were observed in the improved flavor of the product sample.

Other sample products were made which contained varying amounts of leucine and it was found that very satisfactory aromas and flavors could be imparted with as little as 0.1% of this amino acid, and that if it were used in amounts up to 0.3% the level was too high. Likewise, when 0.15% leucine was used with as much as 0.5% arginine (giving a total of 0.65% amino acid) the levels were a bit too high to obtain desirable aromas and flavors in the final product.

*Example III*

In this example the condensation product serving as the flavor-enhancing agent was formed prior to introduction into the bread mix. This was done by reacting 0.05 gram of leucine, 0.45 gram of arginine and 0.54 gram of dextrose in a small amount of water just sufficient to dissolve all of the reactants. The solution was boiled for 45 minutes with the addition of more water as needed to prevent caramelization. The resulting solution was then diluted to 112 ml., chilled and used in place of the 112 ml. of ice water in making the bread-like formulation as described in Example I. The dough was mixed and baked in the same manner as in Example I. The resulting loaf had a brown crumb as well as crust giving it the appearance of a whole wheat bread. The aroma and flavor of the bread were less raw and doughy than the control with more toasted interest and character. However, the overall aroma and flavor were not as satisfactory as the product formed in Example II containing 0.1% leucine and 0.45% arginine or histidine which were reacted with the sugars during baking.

*Example IV*

In this example the amino acid components were introduced in the form of a hydrolysate prepared by hydrolyzing cottonseed meal with hydrochloric acid.

The hydrolysate was prepared by reacting 600 grams of cotton seed meal with 1200 ml. of 6 N hydrochloric acid. This mixture was refluxed for 48 hours; the reaction mixture was removed from the flask, washed with excess water and then filtered. The filtrate was partially decolorized by adsorption on activated charcoal and then was alternately evaporated nearly to dryness and rediluted with water several times to remove the excess hydrochloric acid. It was necessary to remove the final traces of hydrochloric acid by passing the dilute filtrate through a strong base anion-exchange resin. After the filtrate had been completely neutralized in the ion-exchange column it was lyophilized using standard techniques. This was done by freezing about 300 ml. of the solution around the walls of a 5-liter round bottom flask and evacuating the system. By repeating the process a dried product was obtained which could be ground for introduction into the dry mix.

When the hydrolysate product was added to the dry bread mix of Example I in quantities ranging from 0.125% to 0.25% by weight of the dry mix, it removed the undesirable raw dough-like aroma and flavor from the bread and contributed a brothy, toasted flavor to the resulting bread product.

*Example V*

In this example, as well as in Examples VI and VII, the amino acid source was one which was formed by the enzymatic hydrolysis of the seed or grain material rich in the parent proteins of the amino acids required.

The procedure in forming the hydrolysate was to permit the enzyme to react with the proteinaceous seed or grain material in the presence of water. To 500 grams of the comminuted proteinaceous material were added 2.5 grams of the enzyme and 1500 ml. of warm water. This mixture was placed in a 55° C. water bath and stirred mechanically for 24 hours. Additional warm water was added to keep the volume relatively constant. At the end of the reaction time the mixture was centrifuged and the decantate was filtered through Whatman No. 1 filter paper. The filtrate was then boiled for 15 minutes to deactivate the enzyme; the total volume of the solution was reduced by evaporation in a rotary evaporator; and finally the product was lyophilized by the technique described in Example IV above. The hydrolysate freeze-dried readily, giving a yellow or light brown powdery product which could be incorporated directly into the dry mix.

A series of loaves of bread-type product were made using various quantities of the protein hydrolysate made from different proteinaceous materials using a variety of proteolytic enzymes.

In this example the proteinaceous material was cottonseed meal and the enzyme was pepsin used in an amount equivalent to 0.5% by weight of the meal. When the hydrolysate was added to the dry bread mix in an amount equivalent to 0.25% by weight, the resulting baked bread product had an aroma which could be characterized as toasted, sweet and bread-like, and a flavor very similar to bakery bread.

*Example VI*

In this example a hydrolysate was made by reacting cottonseed flour with bromellin using an enzyme level of 0.5% in the reaction. The resulting hydrolysate was added to a dry bread mix in an amount equivalent to 0.125% by weight. The resulting baked product had a toasted, bread-like aroma and the raw doughy quality associated with the control was depressed and the resulting flavor had an identity associated with bread.

*Example VII*

The hydrolysate in this example, which was prepared as described in Example V above, was formed by reacting pepsin at an 0.5% level with soybean meal. The resulting hydrolysate was added in quantities equivalent to 0.125% and 0.25% by dry weight of the bread mix. The aromas of the resulting baked product were those associated with home baked bread and the raw, doughy flavor of the control (as shown in Example I) was suppressed.

In order to show that the enhanced flavor and aroma found in Examples V through VII were not contributed by either the protein source material (e.g., cottonseed meal) or by the deactivated enzyme, controls were prepared.

In the first of these controls cottonseed meal was treated precisely as described in Example V except that no enzyme was added. The resulting dry product resulting from this treatment was incorporated into bread mix and the resulting baked product was found to have an aroma and flavor which was either the same as the control loaf or which was characterized by inappropriate perfumy or salty flavors. Likewise, the same amount of enzyme which was calculated to be present in the hydrolysate was deactivated and this material was made up into 112 ml. solutions which were used in place of the ice water. The undesirable aroma and flavor of the control sample remained when this dilute solution of deactivated enzyme was used. Thus, it was shown that it was in fact the condensation products resulting from the reaction of the hydrolysate containing the amino acids and the sugar in the dry mix which served as the flavor-enhancing agents in Examples V through VII, and not the proteinaceous material or deactivated enzymes.

From the above description and examples, it will be seen that there is provided in this invention a flavor-enhancing system which when added to dry mixes designed to be made up into baked products is capable of imparting to those baked products aromas and flavors associated with home-baked bread. In addition, there is disclosed a novel reaction product which furnishes the required amino acids to react to form the flavor-enhancing agents. This novel hydrolysate product makes it possible to incorporate as flavor enhancers amino acids which would otherwise be prohibitive because of costs.

We claim:
1. Process for improving the flavor and aroma of chemically-leavened bread baked from a ready mixed dry composition, characterized by incorporating therein, prior to baking, the reaction products formed by reacting sugar with at least one amino acid selected from the group consisting of leucine, arginine and histidine, the total amino acid concentration before reaction ranging from 0.05% to 0.5% by weight of said ready mixed composition on a dry basis.
2. Process in accordance with claim 1 wherein said sugar and amino acid are reacted prior to said incorporating step.
3. Process in accordance with claim 1 wherein said sugar and said amino acid are reacted subsequent to said incorporating step.

References Cited in the file of this patent

UNITED STATES PATENTS

| | | |
|---|---|---|
| 2,103,495 | Ruckdeschel | Dec. 28, 1937 |
| 2,564,763 | Kass | Aug. 21, 1951 |
| 2,627,462 | Pettibone | Feb. 3, 1953 |
| 2,920,965 | Ziegler et al. | Jan. 12, 1960 |
| 2,969,289 | Matz et al. | Jan. 24, 1961 |

FOREIGN PATENTS

| | | |
|---|---|---|
| 107,367 | Great Britain | Mar. 18, 1918 |

OTHER REFERENCES

"Modern Cereal Chemistry," Fifth Ed., 1957, by Kent-Jones et al., The Northern Publishing Co. (Liverpool, England), p. 9.